United States Patent
Stevens et al.

(10) Patent No.: US 9,601,794 B2
(45) Date of Patent: Mar. 21, 2017

(54) ELECTROCHEMICAL DEVICE COMPRISING A PROTON-CONDUCTING CERAMIC ELECTROLYTE

(71) Applicants: Electricite De France, Paris (FR); Centre National De La Recherche Scientifique—CNRS—, Paris (FR)

(72) Inventors: Philippe Stevens, Noissy-Rudignon (FR); Olivier Joubert, Brains (FR); Yves Piffard, La Chapelle Sur Erdre (FR); Maria Teresa Caldes-Rouillon, Nantes (FR); Thibaud Delahaye, Blanquefort (FR)

(73) Assignees: ELECTRICITE DE FRANCE, Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 56 days.

(21) Appl. No.: 14/453,975

(22) Filed: Aug. 7, 2014

(65) Prior Publication Data
US 2015/0050580 A1 Feb. 19, 2015

Related U.S. Application Data

(62) Division of application No. 12/444,976, filed as application No. PCT/FR2007/052085 on Oct. 5, 2007, now abandoned.

(30) Foreign Application Priority Data

Oct. 11, 2006 (FR) ..................................... 06 08914

(51) Int. Cl.
*H01M 8/10* (2016.01)
*H01M 8/12* (2016.01)
*C25B 13/04* (2006.01)
*C25B 1/04* (2006.01)

(52) U.S. Cl.
CPC ............. *H01M 8/1246* (2013.01); *C25B 1/04* (2013.01); *C25B 13/04* (2013.01); *H01M 8/1016* (2013.01); *H01M 8/1253* (2013.01); H01M 2008/1293 (2013.01); H01M 2300/0074 (2013.01); H01M 2300/0077 (2013.01); Y02E 60/521 (2013.01); Y02E 60/525 (2013.01); Y02P 70/56 (2015.11)

(58) Field of Classification Search
CPC ............. H01M 8/1246; H01M 8/1016; H01M 8/1253; H01M 2008/1293; H01M 2300/0074; H01M 2300/0077; C25B 13/04; C25B 1/04
See application file for complete search history.

(56) References Cited

PUBLICATIONS

V. Jayaraman, A. Magrez, M. Caldes, O. Joubert, M. Ganne, Y. Piffard, L. Brohan. Characterization of perovskite systems derived from $Ba_2In_2O_5\square$., Part I: the oxygen-deficient $Ba_2In_{2(1-x)}Ti_{2x}O_{5+x}\square_{1-x}$ ($0 \leq x \leq 1$) compounds, Solid State Ionics 170 (2004) 17-24.*

* cited by examiner

*Primary Examiner* — Carlos Barcena
(74) *Attorney, Agent, or Firm* — Miller, Matthias & Hull LLP

(57) ABSTRACT

The invention relates to the use of a ceramic of formula $Ba_{2(1-x)}M_{2x}In_{2(1-y)}M'_{2y}O_{4+\delta}(OH)_{\delta'}$ where M represents at least one metal cation with an oxidation number II or III or a combination thereof, M' represents at least one metal cation with an oxidation number III, IV, V or VI or a combination thereof, $0 \leq x \leq 1$, $0 \leq y \leq 1$, $\delta \leq 2$ and $0 < \delta' \leq 2$, as solid proton-conducting electrolyte in an electrochemical device, in particular a fuel cell, an electrolytic cell, a membrane separating hydrogen from a gas mixture, or also a hydrogen detector, at an operating temperature of said electrochemical device preferably comprised between 200° C. and 600° C.

11 Claims, 6 Drawing Sheets

ELECTROCHEMICAL DEVICE COMPRISING A PROTON-CONDUCTING CERAMIC ELECTROLYTE

CROSS-REFERENCE TO RELATED APPLICATIONS

Figure 1:
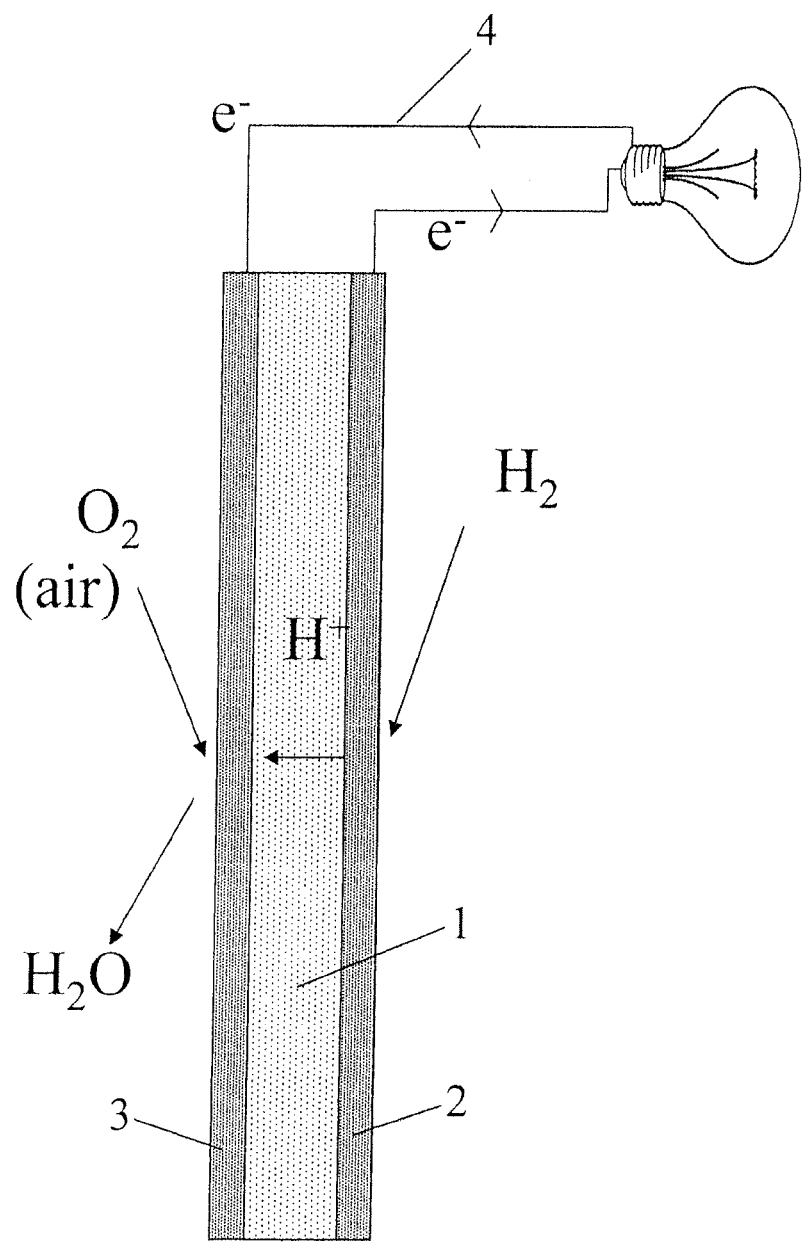

This application is a divisional under 35 U.S.C. 121 of U.S. Ser. No. 12/444,976 filed on Apr. 9, 2009 which was a 35 U.S.C. §371 U.S. national stage filing of International Patent Application No. PCT/FR2007/052085 filed on Oct. 5, 2007, claiming priority to French Patent Application No. FR 06 08914 filed on Oct. 11, 2006.

FIELD OF THE DISCLOSURE

The present invention relates to an electrochemical device, such as a fuel cell or an electrolytic cell, containing, as electrolyte, a proton-conducting ceramic based on barium and indium as well as the use of such a ceramic as proton conductor in an electrochemical device at a temperature comprised between 200° C. and 600° C.

BACKGROUND OF THE DISCLOSURE

Fuel cells are electrochemical generators which continuously, without direct combustion, convert gases such as $H_2$ and $O_2$ into electricity and heat by means of the electrochemical reactions taking place at electrodes separated by an electrolyte. For reasons essentially linked to operating reliability and to mass industrialization constraints, the choice of fuel cells comprising a solid electrolyte is particularly useful.

Currently, the two main types of solid-electrolyte fuel cells are proton-exchange membrane fuel cells (PEMFCs) and solid oxide fuel cells (SOFCs).

The main drawback of PEMFCs lies in the need to hydrate the proton-conducting membrane and in the poor thermal stability of the polymer materials, which limits the use of such cells to a temperature range lower than 120° C. and thus involves the use, in the electrodes, of expensive platinum-based catalysts that are susceptible to carbon monoxide poisoning.

The SOFC technology which involves operating at temperatures generally higher than 700° C. has numerous advantages compared with PEMFCs, such as a high electrical efficiency, often greater than 45%, the possibility of using carbon monoxide as fuel, of direct reforming and the absence of expensive catalysts. However, the high operating temperature of these cells induces a loss of long-term stability, a long start-up time and a low capacity for supporting thermal cycles. At issue for SOFCs is the reduction in the operating temperature in order to limit the degradation reactions at the interfaces, improve resistance to thermal cycling and thus increase the life of the cells.

There is therefore a need for fuel cells allowing the drawbacks of the systems described above to be overcome, i.e. solid-electrolyte fuel cells capable of operating at lower temperatures than SOFCs and less susceptible than PEMFCs to dehydration and carbon monoxide poisoning.

SUMMARY OF THE DISCLOSURE

Within the framework of his research aimed at developing ever more efficient fuel cells, the Applicant discovered that one particular family of ceramic materials, described in more detail below, had excellent proton-conducting properties when they were used in a temperature range from approximately 200° C. to 600° C., in other words in an intermediate temperature range between the operating temperatures of SOFCs and PEMFCs.

The proton-conducting ceramics in question are known per se and have been described in particular in the article by V. Jayaraman et al., published in *Solid State Ionics*, 170, (2004), pages 25-32. They are materials based on barium and indium oxide having oxygen vacancies, the vacancies of which are at least partially filled by hydroxyl groups reversibly fixed by hydration of the materials. In the cited article, Jayaraman et al. assessed the proton conductivity of the ceramic materials at temperatures ranging from room temperature to approximately 180° C. and obtained unsatisfactory results, the maximum proton conductivity at 180° C. not exceeding $10^{-6}$ S.cm$^{-1}$. These authors did not take conductivity measurements at above 180° C. because they had observed that the dehydration of the ceramic material started from approximately 200° C., a dehydration which should in principle be reflected in a reduction in the proton conductivity following the disappearance of the hydroxyl groups.

The present invention is based on the discovery that, despite the phenomenon of dehydration of the ceramic material, observed at above 200° C., the materials described in this article have a high proton conductivity at temperatures comprised between 200° C. and 600° C., and may thus be used as solid electrolyte in fuel cells, but also in other electrochemical devices using proton conductors, such as electrolytic cells, hydrogen separation membranes or hydrogen detectors.

As a result, the subject-matter of the present invention is the use of a ceramic of formula (I)

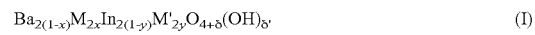

$$Ba_{2(1-x)}M_{2x}In_{2(1-y)}M'_{2y}O_{4+\delta}(OH)_{\delta'} \qquad (I)$$

where
M represents at least one metal cation with an oxidation number II or III or a combination thereof, M' represents at least one metal cation with an oxidation number III, IV, V or VI or a combination thereof, $0 \leq x \leq 1$, $0 \leq y \leq 1$, $\delta \leq 2$ and $0 < \delta' \leq 2$, as solid proton-conducting electrolyte in an electrochemical device, in particular a fuel cell, an electrolytic cell, a membrane separating hydrogen from a gas mixture, or also a hydrogen detector.

The ceramic material is preferably used in the temperature range where its proton conductivity is at its maximum, i.e. at a temperature comprised between 200° C. and 600° C., in particular between 300° C. and 500° C.

The subject-matter of the present invention is moreover such an electrochemical device containing a solid proton-conducting electrolyte made of a ceramic of formula (I)

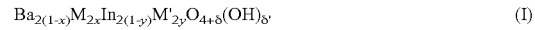

$$Ba_{2(1-x)}M_{2x}In_{2(1-y)}M'_{2y}O_{4+\delta}(OH)_{\delta'} \qquad (I)$$

where
M represents at least one metal cation with an oxidation number II or III or a combination thereof, M' represents at least one metal cation with an oxidation number III, IV, V or VI or a combination thereof, $0 \leq x \leq 1$, $0 \leq y \leq 1$, $\delta \leq 2$ and $0 < \delta' \leq 2$.

In a particular embodiment, the electrochemical device is a fuel cell comprising an anode compartment, with an anode, fed continuously with hydrogen or with a gas mixture containing hydrogen and a cathode compartment, with a cathode, fed with oxygen or air, the two compartments being separated by the proton-conducting electrolyte of formula (I) above.

In another embodiment, the electrochemical device is an electrolytic cell comprising a negative electrode, or cathode, and a positive electrode, or anode, separated from each other by a proton-conducting electrolyte of formula (I) above.

In a third embodiment, the device of the present invention is a hydrogen purification membrane comprising a positive electrode and a negative electrode separated by a proton-conducting ceramic of formula (I) above.

In a fourth embodiment, the device of the present invention is a hydrogen purification membrane formed by a fritted solid containing a percolating mixture (i) of particles of at least one electron-conducting material and (ii) of particles of at least one proton-conducting ceramic of formula (I) above.

Finally, in a last embodiment, the device of the present invention is a hydrogen detector comprising
a positive electrode,
a negative electrode,
the two electrodes being separated by a proton-conducting ceramic of formula (I) above, and a perforated lid covering the whole of the surface of the positive electrode.

Such an electrochemical device, when it is a fuel cell, combines many advantages of SOFC or PEMFC type fuel cells described in the introduction, but without suffering from their drawbacks. Such a device can operate in mobile or stationary applications. Like SOFCs, it has a high electrical efficiency and a high co-generation temperature but it differs from SOFCs mainly by a markedly lower optimum operating temperature, comprised between 200° C. and 600° C. This reduction in the operating temperature leads to an increase in the life of the electrochemical devices, to a better resistance to thermal cycling, and allows the expensive ceramics and steels, used for SOFC interconnectors, to be replaced by standard steels. Unlike PEMFCs, the electrochemical devices of the present invention do not need expensive platinum-based catalysts and are not susceptible to carbon monoxide poisoning.

The proton-conducting ceramic material used as solid electrolyte in the electrochemical device of the present invention must have a negligible electronic conductivity, in order to avoid short-circuits. It must moreover be impermeable to gases and preferably be in the form of a fritted material with closed porosity. This closed porosity is preferably minimized, in other words the ceramic material advantageously has a high level of compactness, preferably greater than 95%.

The ceramic materials of formula (I) above are distinguished by an excellent suitability for fritting: they can be compacted to the desired level of compactness, greater than 95%, by fritting at a relatively low temperature, less than or equal to 1400° C., and typically comprised between 1300° C. and 1400° C.

Another advantage of the ceramic materials of formula (I) lies in the fact that, unlike other ceramic materials, they do not react, in the temperature range from 200° C. to approximately 550° C., with the carbon dioxide likely to be present in the anode compartment of the cell. The formation of carbonates is one of the factors which limit the operating temperature of the electrochemical device of the present invention in the presence of $CO_2$.

The proton-conducting ceramic material of the present invention has a perovskite-type crystalline structure derived from $Ba_2In_2O_5$ by partial replacement of the barium and/or indium ions and hydration of at least some of the oxygen vacancies, forming hydroxyl groups, essential for the proton conduction of the ceramic materials.

The proton conduction of the ceramic materials in fact stems from the transfer of protons between $(OH)^-$ and $O^{2-}$ groups, known as the Grotthus mechanism. The level of conductivity at a certain temperature is related to the mobility of the proton and to its concentration. The proton concentration depends directly on the density of the hydroxyl groups introduced into the material by the hydration reaction of the oxygen vacancies. The concentration of the oxygen vacancies can, in turn, be modulated by replacing some of the barium and/or indium ions with metallic ions (M or M') having a different oxidation number.

The mobility of the protons is dependent on the ease with which they break their O—H bond with the oxygen of the hydroxyl group bound to a metal cation. This mobility therefore depends on the greater or lesser ionic or covalent nature of the oxygen-metal cation bond. Thus, the level of proton conductivity strongly depends on the composition and the concentration of metallic elements.

The metals M capable of advantageously replacing some of the Ba ions of the basic structure $Ba_2In_2O_5$ are preferably chosen from Sr, Ca and the elements of the lanthanide series.

The metals M' capable of advantageously replacing some of the In ions of the basic structure $Ba_2In_2O_5$ are preferably chosen from Ga, Sc, Y, Ti, Zr, Hf, Nb, Ta, W, Mo and the elements of the lanthanide series. A particularly preferred metal M' is Ti(IV).

The Applicant obtained excellent results, in particular in terms of conductivity, with ceramic materials in which the barium ions were not replaced by other metal cations (x=0) and only a small fraction of the indium ions, less than 30%, was replaced by Ti(IV) ions.

In a preferred embodiment of the electrochemical device of the present invention, the solid proton-conducting electrolyte is consequently a ceramic of formula (Ia)

$$Ba_2In_{2(1-y)}Ti_{2y}O_{4+\delta}(OH)_{\delta'} \quad (Ia)$$

where $0 \leq y \leq 0.7$, preferably $0.15 \leq y \leq 0.7$, in particular $0.15 \leq y \leq 0.7$, $\delta \leq 2$ and $0 < \delta' \leq 2$.

Of course, the performances of the ceramic materials used in the present invention depend not only on the metal cation composition and the number of oxygen vacancies, but also on the level of hydration of the vacancies, each fixed water molecule leading to the disappearance of a vacancy and the formation of two hydroxyl groups. The hydration reaction is a reversible reaction, the equilibrium constant of which depends directly on the operating temperature of the electrochemical device. As already stated above, Jayaraman et al. *Solid State Ionics,* 170, (2004), pages 25-32, had in fact observed that a dehydration phenomenon occurred at temperatures greater than approximately 200° C. However, the Applicant discovered that the reduction in proton conductivity due to the dehydration of the ceramic material was largely compensated for by a dramatic increase in proton mobility at high temperature. The optimum operating temperature of a fuel cell according to the present invention consequently equates to the best compromise between the number of available hydroxyl groups, which decreases with the temperature, and the mobility of each of the protons, which increases with the temperature.

This optimum operating temperature, corresponding to a maximum proton conductivity of the ceramic, is comprised between 200° C. and 600° C., preferably between 300° C. and 500° C. The conducting ceramics used in the present invention thus have, at a temperature in the range from 200° C. to 600° C. and in a humidified air atmosphere containing 3% steam, a proton conductivity at least equal to $10^{-4}$ S/cm. At temperatures close to 400° C., this conductivity, also measured in humidified atmosphere with 3% steam, exceeds $10^{-3}$ S/cm, or even $2.10^{-3}$ S/cm.

The conducting ceramics described above are moreover distinguished by the fact that the hydroxylation reaction of the oxygen vacancies by hydration is accompanied by a small increase in volume. This property guarantees the mechanical stability of the material and prevents it from breaking and cracking when it is subjected to significant variations in temperature at the time of start-up or shutdown of the electrochemical device of the present invention.

The electrochemical device of the present invention may be a standard fuel cell such as represented in FIG. 1, with an anode compartment fed continuously with hydrogen or with a gas mixture containing hydrogen and a cathode compartment fed with oxygen or air, the two compartments being separated by the proton-conducting electrolyte (1) of formula (I). The hydrogen, on contact with the negative electrode (2) or anode, decomposes into electrons and protons. The protons are conveyed through the proton-conducting electrolyte (1) to the positive electrode (3) or cathode, creating an electric current by transferring the electrons to the electrical circuit (4) of the cell. At the cathode (3), the combination of the protons with the oxygen and the electrons transported by the electrical circuit leads to the formation of water. The anode may be constituted for example by a percolating mixture, i.e. a mixture allowing the electrons and protons to percolate, by a metal such as nickel or platinum and by the proton-conducting ceramic of the present invention. The cathode is constituted for example by a percolating mixture of an electron-conducting ceramic ($LaNiO_4$) and of the proton-conducting ceramic of the present invention.

Figure 2:
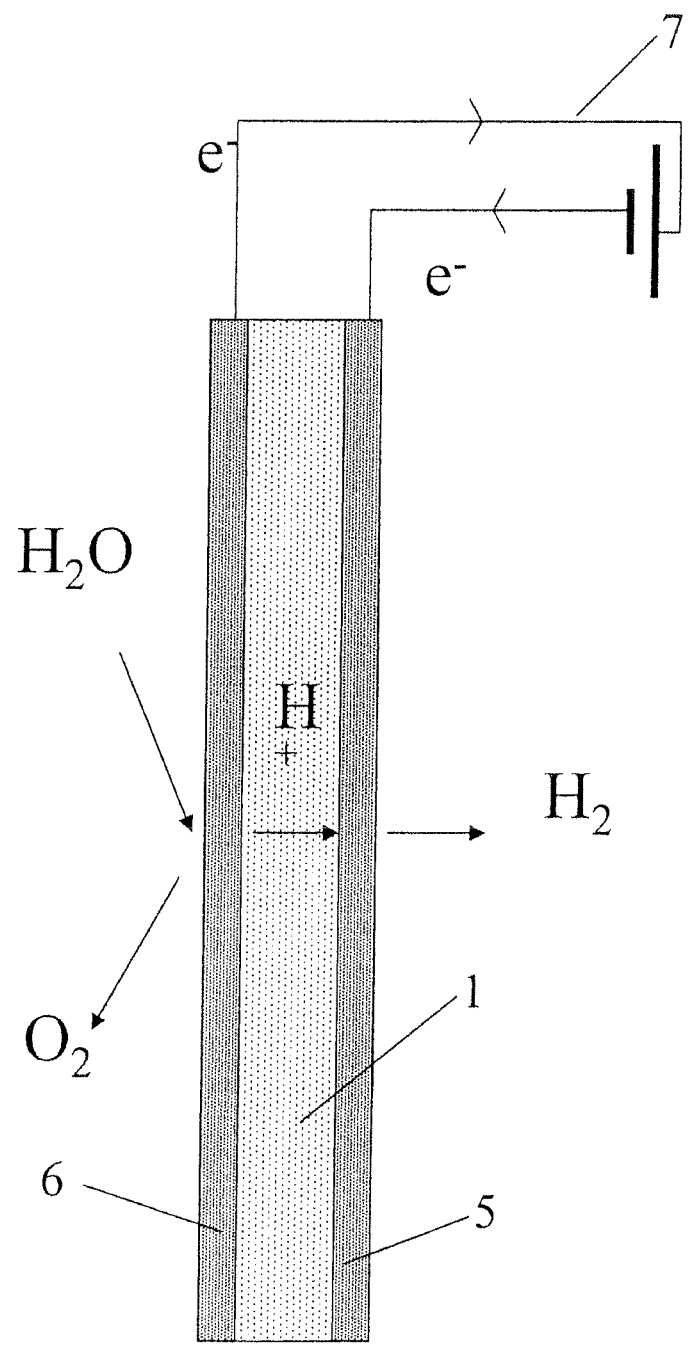

The electrochemical device of the present invention may of course also be an electrolytic cell, as represented in FIG. 2, in which the reaction opposite to that which takes place in the fuel cell of FIG. 1 occurs. In such an electrolytic cell, a current is applied between a negative electrode (5) or cathode and a positive electrode (6) or anode, separated from each other by a proton-conducting electrolyte (1) of formula (I) as described above. Water introduced at the anode compartment is decomposed in a known manner into protons, electrons and oxygen. The protons pass through the proton-conducting electrolyte and combine in the cathode compartment with the electrons led by the electrical circuit (7) to form hydrogen.

DETAILED DESCRIPTION OF THE DISCLOSURE

Figure 3:
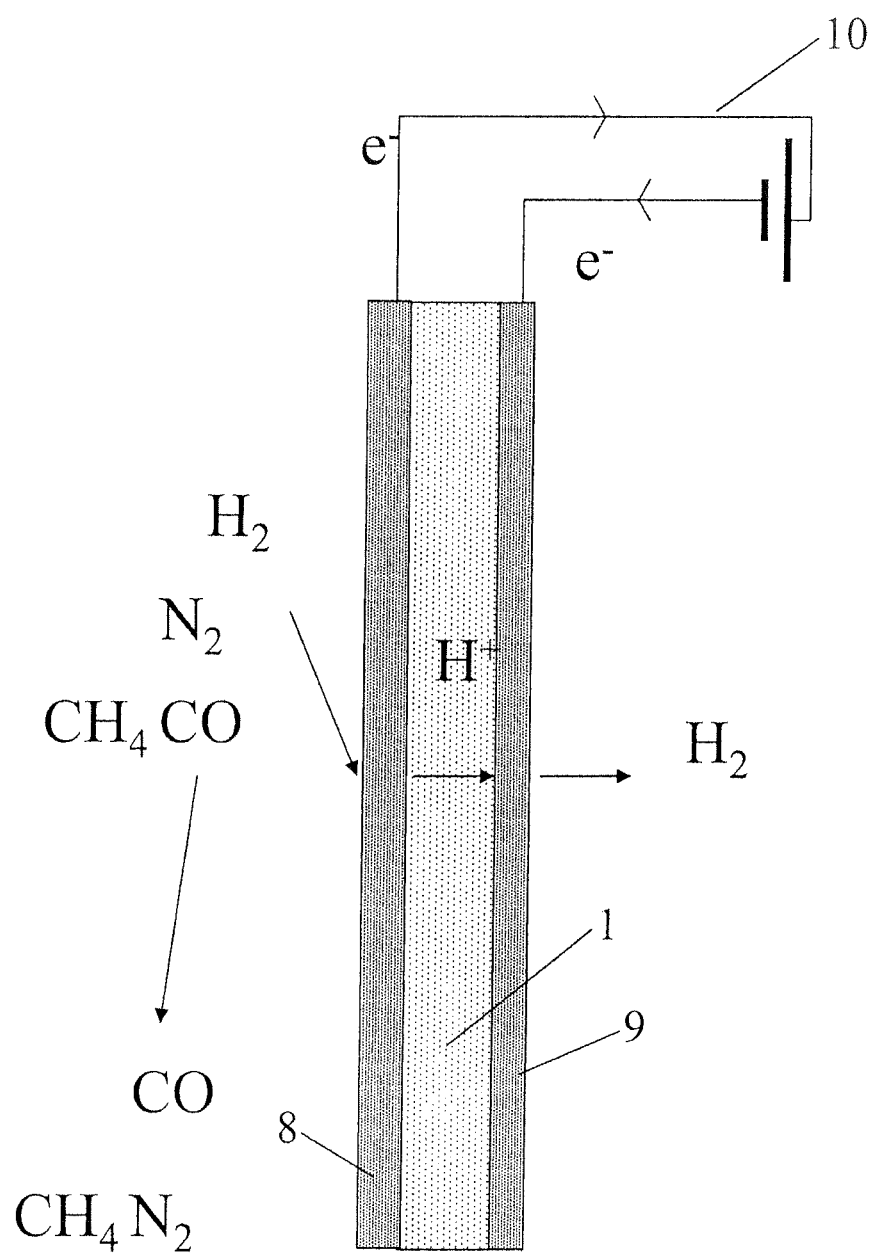
Figure 4:
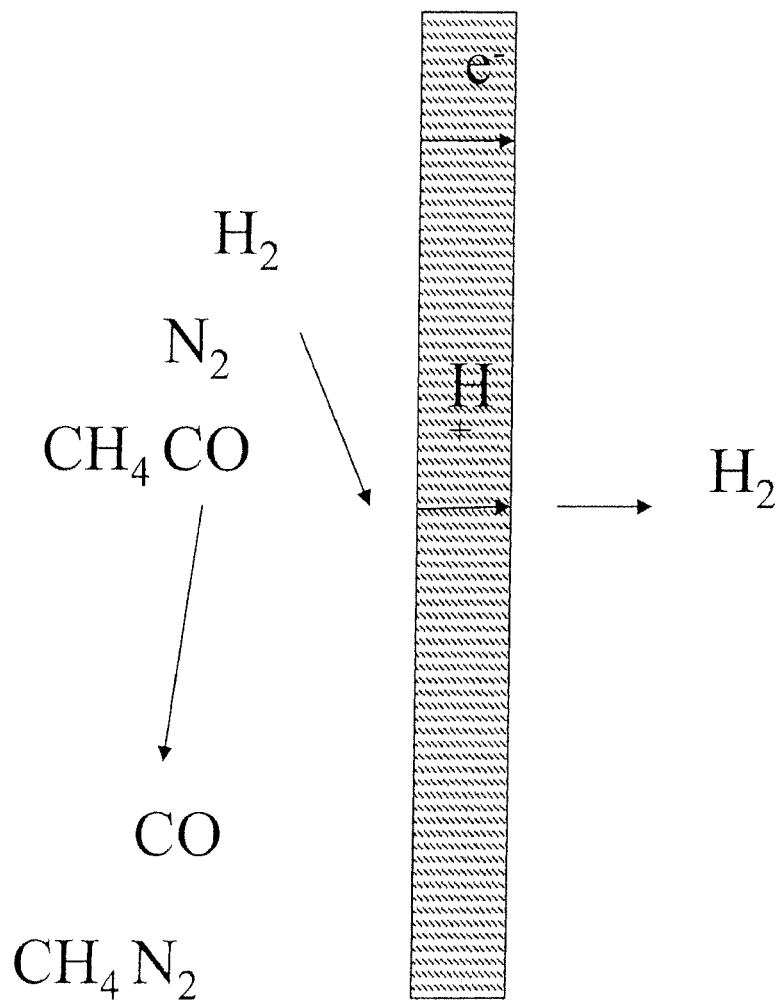
Figure 5:
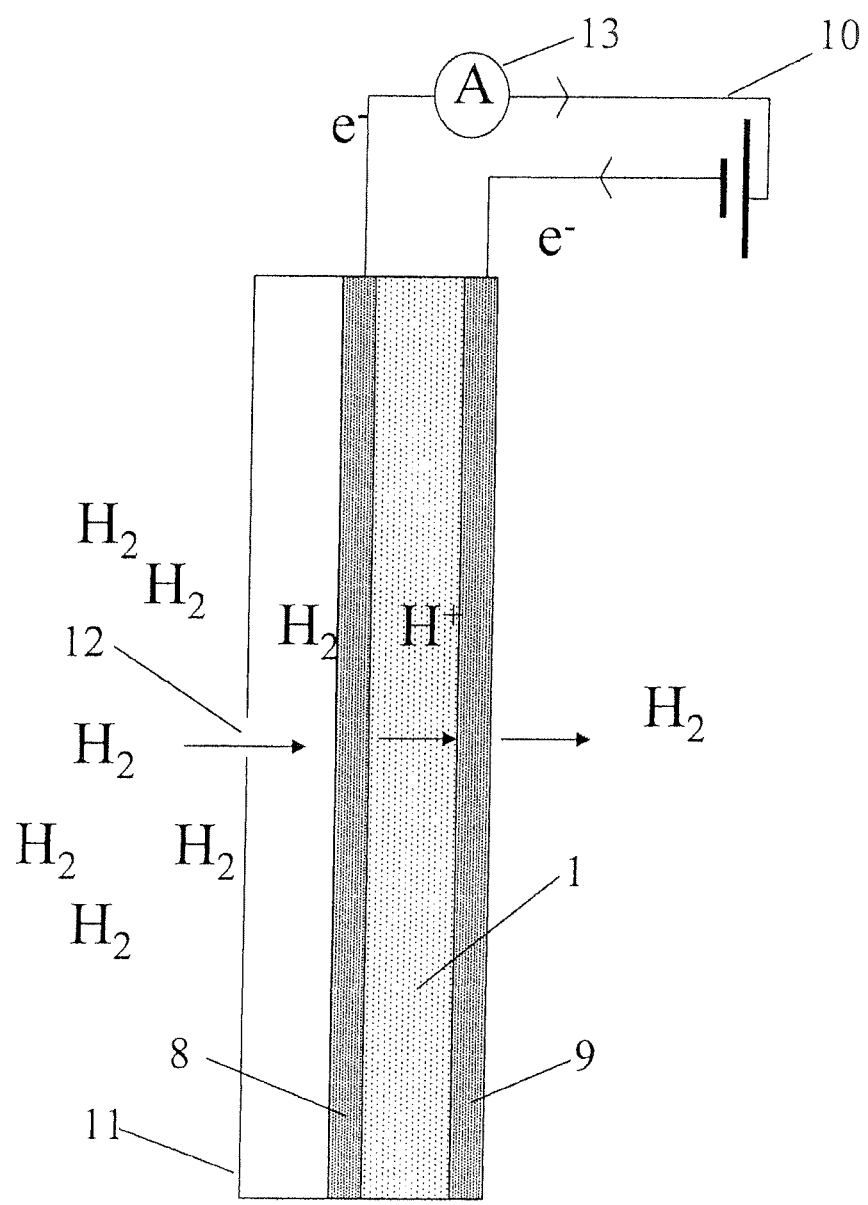
Figure 6:
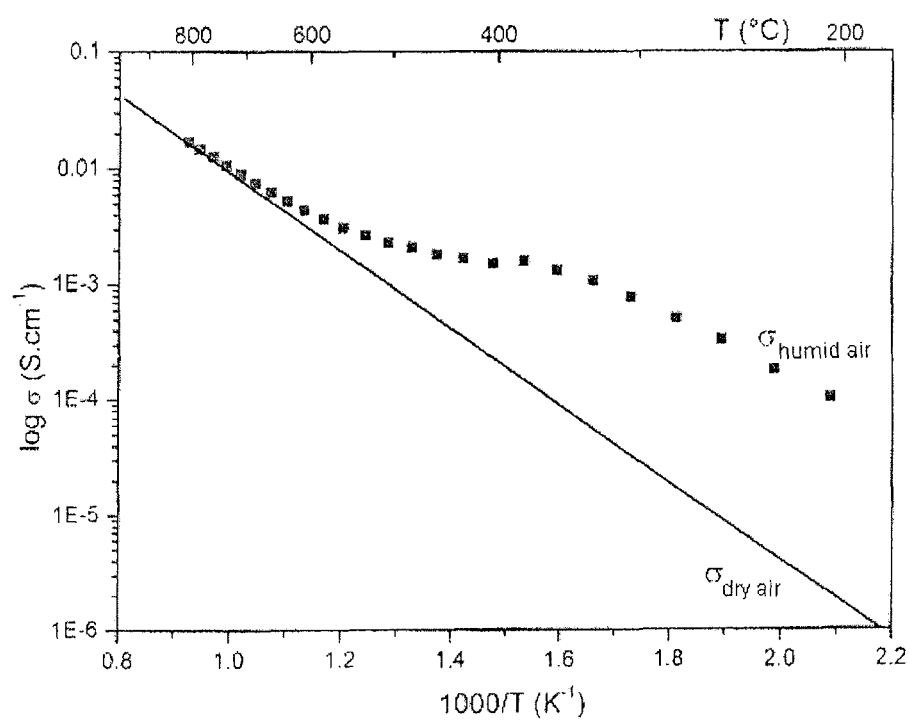

FIG. 1 is a schematic view of a fuel cell;
FIG. 2 is a schematic view of an electrolytic cell according to the present disclosure;
FIG. 3 is a schematic view of a selective hydrogen purification membrane according to the present disclosure;
FIG. 4 is schematic view of another hydrogen purification membrane according to the present disclosure;
FIG. 5 is schematic view of a hydrogen detector using a proton-conducting ceramic accordingly to the present disclosure; and
FIG. 6 is a graph showing the conductivity of a compound under humidified air in relation to temperature.

The electrochemical device of the present invention may also be a selective hydrogen purification membrane, one embodiment of which is represented in FIG. 3. Such a membrane comprises a positive electrode (8) and a negative electrode (9) separated by a proton-conducting ceramic (1) of the present invention. The hydrogen contained in a gas mixture ($H_2$, $N_2$, $CH_4$, $CO$) decomposes into protons and electrons on contact with the positive electrode (8). While the protons formed migrate under the influence of the electric potential through the proton-conducting ceramic (1) to the negative electrode (9), the electrons enter the electrical circuit (10). At the negative electrode, the protons and electrons recombine to form pure hydrogen.

Another embodiment of a hydrogen purification membrane is represented in FIG. 4. Such a membrane must contain, in addition to the proton-conducting ceramic of formula (I), at least one electron-conducting material, such as a metal. The proton-conducting material and the electron-conducting material are generally mixed in the form of powders and compacted and fritted jointly so as to form a percolating mixture, i.e. a mixture allowing the electrons and protons to percolate through a continuous network of the electron- or proton-conducting material. The operating principle of such a membrane is the following: one side of the membrane is brought into contact with a pressurized gas mixture containing hydrogen to be purified.

On contact with the membrane, the hydrogen decomposes into protons and electrons. The former pass through the membrane via the proton-conducting material of formula (I) while the latter are led by the electron-conducting material. As the membrane is also impermeable to the other gases of the mixture, the recombining of the protons and electrons leads to the formation of pure hydrogen on the other side of the membrane.

The only motive power of such a membrane is the partial pressure difference of hydrogen on either side of the membrane. The higher this is, the more effective the membrane is.

FIG. 5 represents a hydrogen detector using a proton-conducting ceramic of the present invention. This detector operates essentially according to the same principle as the separation membrane represented in FIG. 3, except that the whole of the surface of the positive electrode (8) is covered by a perforated lid (11). When this lid is brought into contact with a gas mixture containing hydrogen, some of this mixture passes through the opening (12) of the lid (11) and diffuses towards the positive electrode (8). The decomposition of the hydrogen on contact with the positive electrode (8) gives rise to a current, the intensity of which, measured by an ammeter (13) in the electrical circuit (10), is directly proportional to the concentration of $H_2$ in the gas mixture.

EXAMPLE

Preparation of a Proton-Conducting Ceramic

Barium carbonate $BaCO_3$, titanium oxide $TiO_2$ and indium oxide $In_2O_3$ are mixed in the suitable proportions to obtain a material of formula (I) where M'=Ti, x=0 and y=0.2. The powders are placed in a mortar, then mixed while grinding with acetone. After evaporation of the acetone, the mixture of powders is placed in a platinum crucible and heated at a rate of 400° C./h to a temperature of 1200° C., then kept at this temperature for 24 hours. The material is then cooled to room temperature at exactly the same rate at which it was heated, then the product obtained is ground using a mortar so as to obtain a fine powder. This powder is then compacted using a uniaxial press and pressed into pellets. The pellets then undergo a thermal treatment under air atmosphere at 1350° C. for 24 hours (rate of heating and cooling of 140° C./h). This first stage leads to a partially hydrated pure material corresponding to the formula $Ba_2In_{1,6}Ti_{0,4}O_{5,2-\delta'/2}(OH)_{\delta'}$ ($\delta'<0.8$). This material is then raised to a temperature of approximately 200° C. under a humidified air atmosphere ($P_{H2O}$ 3%) and kept in these conditions for one week. This hot hydration leads to a material of formula $Ba_2In_{1,6}Ti_{0,4}O_{4,4}(OH)_{1,6}$.

When this material is heated in a humidified $CO_2$ atmosphere ($P_{H2O}$ 3%) a chemical stability vis-à-vis carbon dioxide up to a temperature of approximately 550° C. is observed. Above this temperature, the material reacts with the carbon dioxide at a rate proportional to the temperature.

The powder obtained at the end of the first stage is then ground for 2 hours using a planetary mill (0.5 g powder in ethanol, 500 r.p.m., 3 beads per jar) then compacted using a uniaxial press. The tablet is subjected to a thermal treatment under an air atmosphere at 1350° C. for 24 hours (rate of heating and cooling 140° C./h). Scanning electron microscopy of the sample obtained reveals a closed porosity lower than 5%. The dense sample, subjected to a thermal cycling between 30° C. and 800° C. under humid atmosphere, in other words to a succession of alternating between hydration and dehydration, does not show any sign of cracking or breaking.

The electrical characterization of the sample was obtained by complex impedance spectroscopy under a controlled oxygen or steam atmosphere. FIG. 6 shows the conductivity of the compound $Ba_2In_{1.6}Ti_{0.4}O_{5.2-\delta'/2}(OH)_{\delta'}$, under humidified air (■) at 3% in relation to the temperature. The conductivity curve of the non-protonated compound $Ba_2In_{1.6}Ti_{0.4}O_{5.2}$ under dry air is also given, for information only. The conductivity of the hydrated material reaches a value of $2 \cdot 10^{-3}$ S.cm$^{-1}$ at approximately 400° C., at which temperature $\delta'$ is approximately equal to 0.25. This figure illustrates the optimum operating range of the proton-conducting material of the present invention. In fact, at temperatures lower than 200° C., the material is strongly hydrated but the limited mobility of the protons is reflected in insufficient conductivities. Above approximately 550° C. to 600° C., the material is almost completely dehydrated and the conductivity curve determined under humid atmosphere overlaps that determined under dry atmosphere. The conductivity is thus essentially anionic ($O_2^-$).

The invention claimed is:

1. A process for producing an electric current comprising the steps of
providing a fuel cell comprising an anode compartment with an anode, and a cathode compartment with a cathode, the two compartments being separated by a proton-conducting ceramic electrolyte of formula $$Ba_2In_{2(1-y)}M'_{2y}O_{4+\delta}(OH)_{\delta'}$$

where
M' represents at least one metal cation with an oxidation number III, IV, V or VI or a combination thereof, $0 \leq y \leq 1, \delta \leq 2$ and $0 < \delta' \leq 2$,
and an electrical circuit connecting the anode to the cathode,
feeding the anode compartment with hydrogen or with a gas mixture containing hydrogen, and
feeding the cathode compartment with oxygen or air,
wherein the fuel cell is operated at a temperature of at least 200° C.

2. The process as claimed in claim 1 wherein said ceramic electrolyte has a proton conductivity, measured at 400° C., greater than $10^{-3}$ S/cm.

3. The process as claimed in claim 1, wherein M' represents a cation of a metal selected from the group consisting of Ga, Sc, Y, Ti, Zr, Hf, Nb, Ta, W, Mo and the elements of the lanthanide series.

4. The process as claimed in claim 3, wherein M' represents Ti(IV).

5. The process as claimed in claim 1, wherein $0 \leq y \leq 0.7$.

6. The process as claimed in claim 1, wherein $0 \leq y \leq 0.3$.

7. The process as claimed in claim 1, wherein the ceramic is impermeable to gases.

8. The process as claimed in claim 1, wherein the ceramic is a fritted ceramic material.

9. The process as claimed in claim 8, wherein the ceramic material has a closed porosity and a level of compactness greater than 95%.

10. The process as claimed in claim 9, wherein the closed porosity and the level of compactness greater than 95% can be obtained by fritting at a temperature lower than or equal to 1400° C.

11. The process as claimed in claim 1, wherein the fuel cell is operated at a temperature of between 300° C. and 500° C.

* * * * *